Patented Nov. 11, 1941

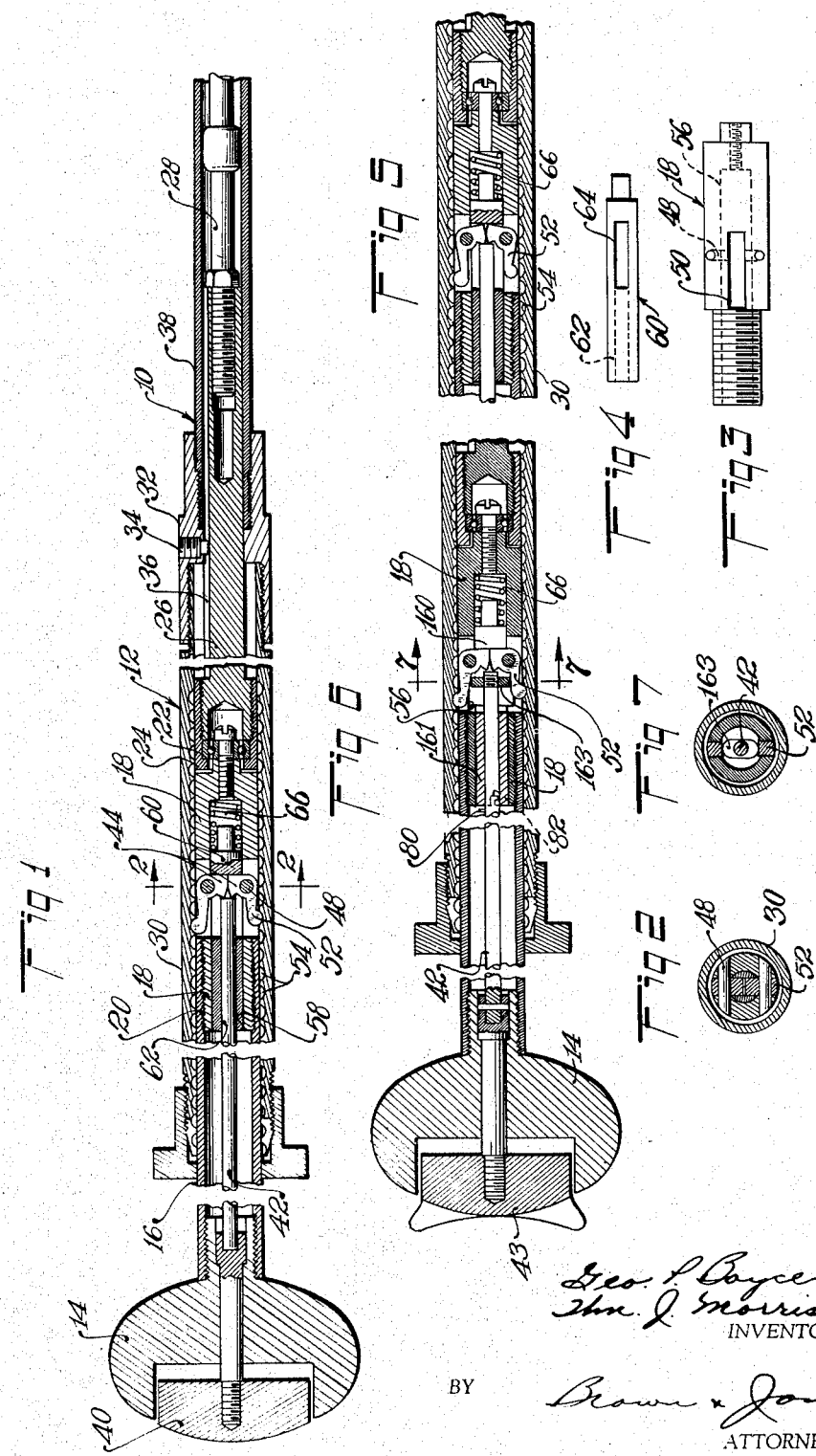

2,262,448

UNITED STATES PATENT OFFICE 2,262,448

CONTROL DEVICE

George P. Boyce, Forest Hills, and William J. Morrison, Queens Village, N. Y., assignors to Simmonds Aerocessories, Inc., New York, N. Y., a corporation of New York Application January 24, 1939, Serial No. 252,603

9 Claims. (Cl. 74—503)

This invention relates to a control mechanism and more specifically to a control mechanism with a fine adjustment.

In general, it is an object of the invention to provide a device of the character described which will efficiently perform the purposes for which it is intended, which is simple and economical of construction, which can be expeditiously, conveniently and safely manipulated, and which can be readily manufactured and assembled.

Another object of the invention is to provide a control mechanism for operating valves, etc., which is susceptible to smooth, uninterrupted, linear displacement and to a fine, final adjustment independent of any previous, fine, final adjustment and to a positive, fine, final adjustment and to such an adjustment which may be as great in displacement as the preceding principal displacement.

Another object is to provide such an aforesaid mechanism in which the fine adjustment mechanism is positive and may be disconnected and rendered inoperative and to provide such a mechanism which may be locked in position by means operable at the main handle and operative portion of such mechanism.

Other objects of the invention will in part be obvious and will in part appear hereinafter.

The invention accordingly comprises the features of construction, combination of elements, and arrangement of parts, which will be exemplified in the construction hereinafter set forth and the scope of the application of which will be indicated in the claims.

For a fuller understanding of the nature and objects of the invention, reference should be had to the following detailed description, taken in connection with the accompanying drawing, in which:

Figure 1 is a view in cross-section of a device embodying one form of the invention;

Fig. 2 is a device in cross-section of the device shown in Fig. 1 and taken along the line 2—2;

Fig. 3 is a view of one of the parts of the device shown in Fig. 1;

Fig. 4 is a view of another of the parts of the device shown in Fig. 1;

Fig. 5 is a view of a portion of the device shown in Fig. 1, the parts being in a different operative position;

Fig. 6 is a view of a portion of a device which is a modified form of the device shown in Fig. 1; and Fig. 7 is a cross-section of the device shown in Fig. 6 and taken along the line 7—7.

It is highly desirable that means for controlling valves, etc. in the case of powerful engines, such as airplane engines, should be not only smoothly operable so that the desired result may be quickly obtained but also to have a final adjustment of the vernier type. This latter adjustment should be quite unlimited in its scope. Although it is usual for such adjustments to be small, nevertheless the entire mechanism should not be limited to small adjustments. Furthermore, the means which provide these adjustments should not interfere with the principal action of the control when the adjustment is not in use. There have been devices heretofore in which the final adjustment was limited by earlier adjustments made in connection with earlier positionings of the control. There have also been devices which did not give a smooth, uninterrupted action for the principal displacement of the control. It is contemplated that the present device may be used without the above-mentioned drawbacks and with the desirable advantages listed above.

In the drawing, 10 denotes generally a control device which leads more or less remotely to some machine or part thereof (not shown) which is to be controlled. 12 is the general mechanism for operating the control device.

There is a handle 14 at the near end. It is attached to a plunger which is composed of a tubular element 16 and a generally cylindrical, bell crank carrier 18 attached, as by threads 20, to the interior of the far end of the tubular element 16. The plunger elements are attached as desired to the control device. Beyond the bell crank carrier there may be thrust bearings 22, between it and a bushing 24. To the latter there is attached, in any convenient way, the end piece 26 of the control device 10 which is, in turn, joined in any suitable fashion to the first link 28 of a series of links or other similar arrangement.

The cylindrical elements 16 and 18 are slidable in a barrel 30 which may be fixed in and passed through an instrument panel in an airplane. At the far end of the barrel there may be a cap 32 with a set screw 34 through the cap and slidable in a channel 36 in the end piece 26. By means of the screw the control device is axially slidable with respect to the cap and barrel but is not rotatable with respect to them. There may be a casing 38 surrounding the linkage 28.

Releasable means are provided for preventing the smooth axial motion of the plunger except as a concomitant of a rotation of the plunger.

These means are for the purpose of giving a possible fine or vernier adjustment. There is a supplemental handle 40 associated with handle 14 and having connected therewith an operating rod 42. The supplemental handle is movable with respect to the main handle in a direction axial to the entire device. The rod 42 presses against the inner arms 44 of the bell cranks 46 which are rotatable upon pivots 48 and which are positioned in a slot 50 which passes through the bell crank carrier centrally thereof from one side to the other. The ends of the outer arms 52 of the bell cranks fit into a helical thread 54 on the inner surface of the barrel 30.

The bell crank carrier 18 has an axial bore 56 in line with an axial bore 58 in the generally aligned cylindrical element 16.

There is a member 60 (see Fig. 4) which extends along the bores 56 and 58. Its near end, which sits in the plunger element 16, is itself provided with a bore 62. The member 60 also has a slot 64 which is always at least in part in registry with the slot 50 in the bell crank carrier. The slot 64 extends centrally through member 60 from side to side. The inner arms 44 of the bell cranks 46 are always in the slot 64. The bore 62 accommodates the passage therethrough of the rod 42. A spring 66, in the bore 56 of the bell crank carrier, pushes the member 60 against the bell cranks.

The operation of the device is as follows: The barrel 30 is stationary through the instrument panel. The supplemental handle 40 is pushed in, causing the rod 42 to slide slightly through the bore of member 60 and push against the inner arms 44 of the bell cranks which are rotated thereby until they assume the position shown in Fig. 5, in which position they hold the member 60, by pushing against the end wall of slot 50, in tension against the spring 66. With the bell cranks in this latter position, the outer arms 52 thereof are withdrawn radially inward out of contact with the helical thread 54. The main plunger and the attached end pieces of the control device are then free to slide smoothly and uninterruptedly in an axial direction in the barrel 30. Pressure upon the main handle 14 then causes such a movement of the parts whereby a large and rapid movement of the control device is obtained.

It is usually desirable to have a slight vernier final adjustment of the control device. When supplemental handle 40 is released, the spring 66 pushes the member 60 against the inner bell crank arms, causing the bell cranks to pivot so that their outer arms fit into the helical threads 54. To permit this, the rod 62 and supplemental handle 40 slide axially by a small amount. Thereafter, the rotation of the handle 14 is communicated to the plunger 16, 18 and the arrangement of the bell cranks between the plunger and the threads causes the former to move axially at the same time as it is rotated. This vernier axial displacement is transmitted to the control device 10. It will be noted that no matter what the length of the principal sliding displacement has previously been, any or all of that displacement may be corrected by the vernier adjustment. This vernier adjustment is brought about by the positively operating vernier means.

Means may be provided to lock the device so that the parts will only slide in the barrel 30. These may comprise a pin 80 extending radially from rod 42 and slidable, as the rod moves longitudinally, in a slot 82 in bushing 161. There is a bend in the end of the slot so that a slight rotation of the rod, which rotation is not enough to affect other parts, causes the pin to catch. The pin slot and bend are so positioned that the pin is caught when the arms 44 are retracted from the barrel 30.

Figs. 6 and 7 show a modification in which the positively acting vernier means may be locked in position. In the form of the device there shown, the member 60 is in two separate parts, one part 160 slidable in the bore 56 of the crank carrier 18 and the other part 161 which acts merely as a sleeve between the near end of the carrier 18 and the operating rod 42. That rod has a cam 163 attached thereto and extending radially therefrom into an enlargement of the bore 56. The cam is so shaped that when it is turned by the turning of the rod and the supplemental handle 43 the larger dimension of the cam comes into play and the cam jams against the outer bell crank arms 52 to lock them into the helical threads 54.

Since certain changes may be made in the above construction and different embodiments of the invention could be made without departing from the scope thereof, it is intended that all matter contained in the above description or shown in the accompanying drawing shall be interpreted as illustrative and not in a limiting sense.

It is also to be understood that the following claims are intended to cover all the generic and specific features of the invention herein described, and all statements of the scope of the invention which, as a matter of language, might be said to fall therebetween.

Having described our invention, what we claim as new and desire to secure by Letters Patent is:

1. In a combination of the character described for operating a movable automotive vehicle, control device, mechanism for controlling the movements of the control device, said mechanism comprising an element capable of uninterrupted linear movement in a predetermined direction, positive means for moving said element in a direction opposite to said predetermined direction and comprising means fixed in position, means attached to said element and engageable with and disengageable from said fixed means whereby a motion of said engageable means causes, when in engagement, a motion of said element, means for disengaging said engageable means from said fixed means, whereby said element is movable independently of said fixed and said engageable means, and means, structurally distinct from the first-mentioned means, for operating said disengaging means.

2. In a combination of the character described for operating a movable, automotive vehicle, control device, mechanism for controlling the movements of the control device, said mechanism comprising an element capable of uninterrupted linear movement in a predetermined direction, positive means for moving said element in a direction opposite to said predetermined direction and comprising track means fixed in position, means attached to said element and engageable with and disengageable from said track means whereby a motion of said engageable means causes, when in engagement, a motion of said element, means for disengaging said engageable means from said track means whereby said element is movable independently of said fixed and said engageable means, and means, structurally distinct from the first-mentioned means, for operating said disengaging means.

3. In a combination of the character described for operating a movable, automotive vehicle, control device, mechanism for controlling the movements of the control device, said mechanism comprising an element capable of uninterrupted linear movement in a predetermined direction, positive means for moving said element in a direction opposite to said predetermined direction and comprising helical track means fixed in position, rotatable means attached to said element and engageable with and disengageable from said helical track means whereby a rotary motion of said rotatable means causes, when in engagement, a linear motion of said element, means for disengaging said engageable means from said track means whereby said element is movable independently of said fixed and said engageable means, and means, structurally distinct from the first-mentioned means, for operating said disengaging means.

4. In a combination of the character described for operating a movable, automotive vehicle, control device, mechanism for controlling the movements of the control device, said mechanism comprising an element capable of uninterrupted linear movement in a predetermined direction, positive means for moving said element in a direction opposite to said predetermined direction and comprising a cylindrical fixed element having threads associated therewith, a pivotable arm attached to said first-mentioned element and movable into and out of engagement with said threads, means for moving said arm into and out of engagement with said threads, and a handle connected to said element and movable linearly only in a direction colinear with said predetermined direction.

5. In a combination of the character described for operating a movable, automotive vehicle, control device, mechanism for controlling the movements of the control device, said mechanism comprising an element capable of uninterrupted linear movement in a predetermined direction, positive means for moving said element in a direction opposite to said predetermined direction and comprising a cylindrical fixed element having threads associated therewith, a pivotable arm attached to said first-mentioned element and movable into and out of engagement with said threads, a handle for the first-mentioned element, means, operable independently of a motion of said handle, for moving said arm into and out of engagement with said threads.

6. In a combination of the character described for operating a movable, automotive vehicle, control device, mechanism for controlling the movements of the control device, said mechanism comprising an element capable of uninterrupted linear movement in a predetermined direction, positive means for moving said element in a direction opposite to said predetermined direction and comprising means fixed in position, means attached to said element and engageable with and disengageable from said fixed means whereby a motion of said engageable means causes, when in engagement, a motion of said element, means for disengaging said engageable means from said fixed means whereby said element is movable independently of said fixed and said engageable means, means for locking said engageable means in engageable position, and means, structurally distinct from the first-mentioned means, for operating said disengaging means.

7. In a combination of the character described for operating a movable, automotive vehicle, control device, mechanism for controlling the movements of the control device, said mechanism comprising an element capable of uninterrupted, maximum, slidable, linear movement in a predetermined direction, means operative at any point of such movement for moving said element from said point in a direction opposite to said predetermined direction by an amount equal to the maximum, possible, slidable movement of said element in said predetermined direction to said point, said means comprising helical track means fixed in position, rotatable means attached to said element and engageable wtih said helical track means whereby a rotary motion of said rotatable means causes, when in engagement, a linear motion of said element, means for disengaging said engageable means for said track means whereby said element is movable independently of said fixed and said engageable means, and means, structurally distinct from the first-mentioned means, for operating said disengaging means.

8. In a combination of the character described for operating a movable, automotive vehicle, control device, mechanism for controlling the movements of the control device, said mechanism comprising an element capable of uninterrupted linear and of uninterrupted linear and rotary movement, means for preventing said element from undergoing linear movement except when said element is rotated, means for rendering the first-mentioned means inoperative, said preventing means comprising track means fixed in position, means attached to said element and engageable with and disengageable from said track means whereby a motion of said engageable means causes, when in engagement, a motion of said element, means for moving said element linearly and means, structurally distinct from the last-mentioned means, for operating said engageable and disengageable means.

9. In a combination of the character described for operating a movable, automotive vehicle, control device, mechanism for controlling the movements of the control device, said mechanism comprising an element capable of uninterrupted linear and of uninterrupted linear and rotary movement, means for preventing said element from undergoing linear movement except when said element is rotated, means for rendering the first-mentioned means inoperative, said preventing means comprising helical track means fixed in position, rotatable means attached to said element and engageable with said helical track means whereby a rotary motion of said rotatable means causes, when in engagement, a linear motion of said element, means for disengaging said engageable means from said track means whereby said element is movable independently of said fixed and said engageable means, and means, structurally distinct from the first-mentioned means, for operating said disengaging means.

GEO. P. BOYCE.
WM. J. MORRISON.